Patented Jan. 3, 1950

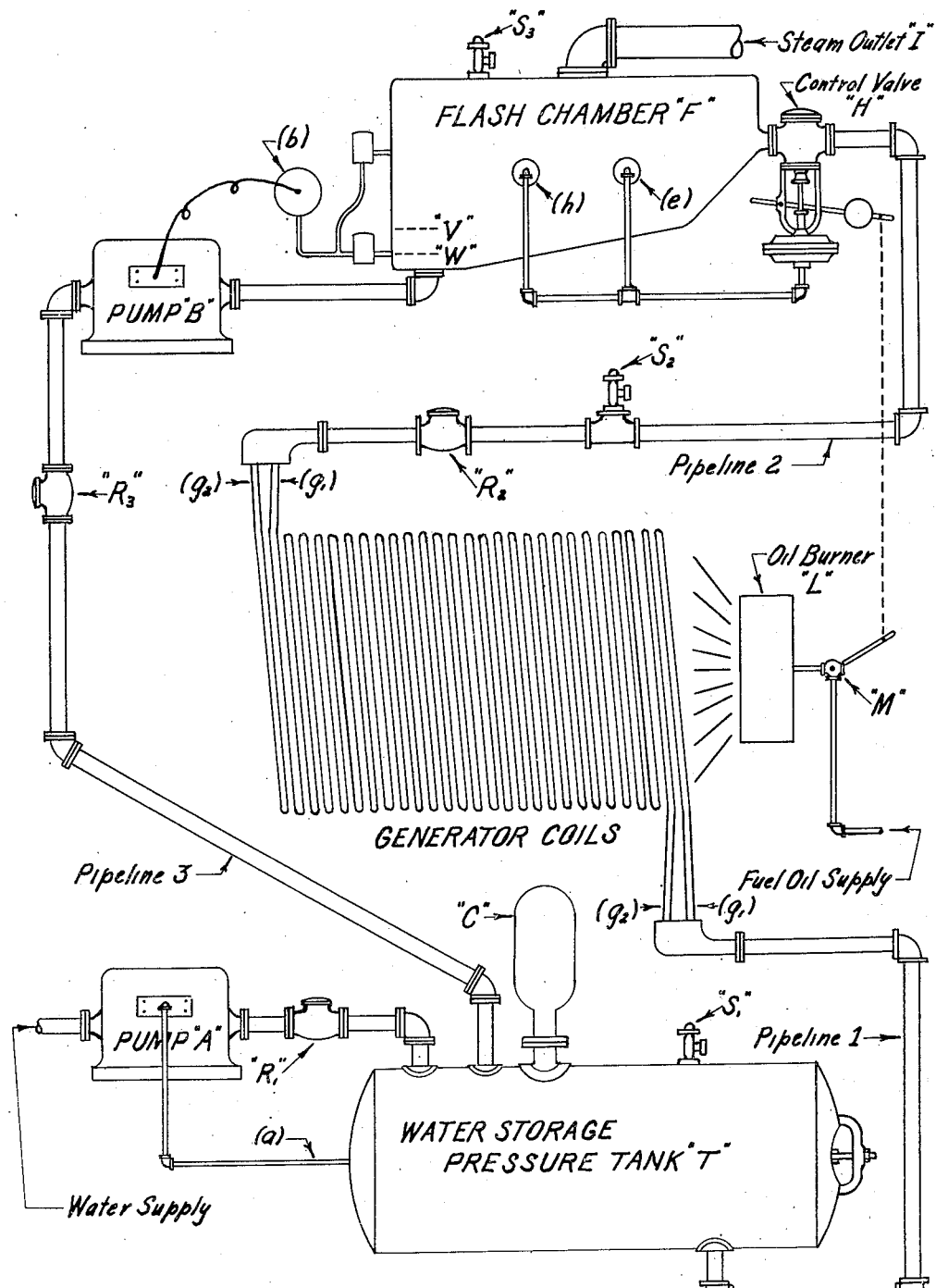

2,493,678

UNITED STATES PATENT OFFICE 2,493,678

STEAM GENERATING BOILER

John Marini, New York, N. Y.

Application March 18, 1944, Serial No. 527,097

4 Claims. (Cl. 122—448)

My invention relates to improvements in steam generating boilers, apparatus, or units used to change liquid water to its vapor, steam, by the application of heat to the liquid in a closed vessel.

At present, most steam generating boilers depend on the natural tendency of heated water to rise above the cooler water in the system to create a flow or cause circulation of water in the boiler. The speed with which this circulating water flows over the heating surface of the boiler determines the amount of heat which the heating surface can safely transmit, per unit area of heating surface, to the water without forming steam pockets and resultant overheating and failure of heating surface metal. Furthermore the steam as generated in the ordinary steam boiler is very nearly wet and an extra unit, usually called a superheater, is employed to change the quality of the steam as required.

With my invention the flow of water over the heating surface of the boiler is controlled so that more heat per unit area of heating surface can be safely transmitted to the boiler water without overheating and failure of heating surface of the boiler thereby making the steam boiler more compact. Furthermore the quality of the generated steam can be changed without the use of extra units such as superheaters.

The objects and advantages of my invention will be apparent from the accompanying drawing and following detailed description.

The single drawing is a schematic, partially diagrammatic, view of one form of my invention for a steam generating boiler.

In view of the fact that standard units such as controlling valves, check valves, water pumps and various pressure control and water level control devices may be employed with my invention and that such devices individually are available in many modified forms, for purposes of clarity and simplicity these devices will not be described in detail but will merely be referred to in terms of their function since their varied forms are well known to the art and the operation of the steam generating boiler, unit, or apparatus using my invention is not dependent upon any specific form of such units.

Referring in detail to the one drawing which illustrates one form of my invention as applied to a steam generating boiler, T is a water reservoir, which I call the water storage pressure tank, containing water under a constant predetermined pressure which is being discharged through pipeline 1 and being forced under pressure from the water storage pressure tank T in a relatively restricted stream through a generator such as generator coils $G_1$ and $G_2$, in excess of that required to meet a steam demand, where said stream of water is heated then flows through pipeline 2 to a control valve H which controls or regulates the rate of discharge of this heated stream of water into a closed vessel F which I call the flash chamber, where steam is separated from the excess unvaporized water at a desired constant pressure which is lower than the pressure on the water in pipeline 2, the generator coils $G_1$ and $G_2$, and the water storage pressure tank T. The steam is withdrawn from the upper portion of the flash chamber F through a steam outlet such as I to meet the steam demand while the excess unvaporized water falls to the bottom of the flash chamber and tends to accumulate and form into a body of water therein which I call accumulated water. This accumulated water is withdrawn from the flash chamber F by a pump B, which raises the pressure on this accumulated water and discharges this water through pipeline 3 into the water storage pressure tank T to be recirculated through the generator coils $G_1$ and $G_2$. A pump A supplies feedwater under pressure to the water storage pressure tank T in sufficient quantities to maintain the water contained therein under the constant predetermined pressure. The accumulated water and the feedwater combine in the water storage pressure tank T to form the water contained therein.

The generator shown in the drawing is made up of two tubes in the form of coils $G_1$ and $G_2$, connected for parallel flow, through which the water is forced and heated. The generator can be made up of either a single tube or of any number of tubes connected for series or parallel flow which, due to the forced water circulation, can be bent in almost any convenient shape to obtain efficient heating of the water. While any source of heat can be used to furnish heat to the generator coils $G_1$ and $G_2$ without departing from the spirit of the invention, an oil burner L is shown on the drawing in this regard which receives its supply of fuel oil through the regulating or controlling valve M. Valve M therefore represents the means to regulate or control the heat input to the generator coils $G_1$ and $G_2$.

The function of the generator, shown on the drawing as generator coils $G_1$ and $G_2$, is to sufficiently heat the stream of water, being forced there-through under pressure, to cause a portion of said stream to flash into steam and separate from the excess unvaporized water when the heated stream of water is discharged from said generator coils $G_1$ and $G_2$ into the flash chamber F wherein the pressure is lower than the pressure under which said stream of water was heated in the generator coils $G_1$ and $G_2$. It is to be understood that for some operating conditions a certain amount of steam will be generated in the generator coils $G_1$ and $G_2$, however such steam as is formed in the said generator coils $G_1$ and $G_2$ will remain in intimately mixed relation with the water and in no case will any separation of the steam occur in the generator coils $G_1$ and $G_2$ as might form steam pockets or slugs of steam in the discharge.

The function of the flash chamber F is to separate the steam, formed by flashing in the flash chamber F together with any steam formed partially in the generator coils $G_1$ and $G_2$, from the excess unvaporized water and enable the steam and the excess unvaporized water to be withdrawn from the flash chamber F independently of each other. The flash chamber F is a closed vessel capable of withstanding pressure. The upper portion of the flash chamber F comprises a steam zone into which the stream of heated water from the generator coils $G_1$ and $G_2$ is discharged through the control valve H. In the lower portion or on the bottom of the flash chamber F the excess unvaporized water accumulates and forms into the body of accumulated water.

Steam is withdrawn from the upper portion of the flash chamber F through any suitable means such as the steam outlet I to meet the steam demand.

The accumulated water is withdrawn from the flash chamber F in such quantities as to maintain the surface level of the body of accumulated water between a predetermined high level and a predetermined low level such as is represented by V and W respectively on the drawing. The difference between the surface water levels V and W can be made so small as to be infinitesimal in which case the surface level of the body of accumulated water can be maintained at a desired predetermined level.

Pump B withdraws the accumulated water from the lower portion of the flash chamber F, raises the pressure on this water, and discharges this water through pipeline 3 into the water storage pressure tank T to be recirculated through the generator coils $G_1$ and $G_2$. Connected with the flash chamber F is a liquid level controller $b$, which can be of the type as manufactured by the Brown Instrument Co., to so control the operation of pump B as to maintain the surface level of the body of accumulated water in the flash chamber F between the predetermined levels V and W. The pump B can be of any desired type and driven by any convenient drive means such as an electric motor.

The primary function of the water storage pressure tank T is to provide a reservoir of water being maintained under a constant predetermined pressure for subsequent forcing through the generator coils $G_1$ and $G_2$ under pressure from the water storage pressure tank T. Another function of the water storage pressure tank T is to make possible the recirculation of the accumulated water from the flash chamber F through the generator coils $G_1$ and $G_2$ without first reducing the pressure on said accumulated water while at the same time maintaining the water in the water storage pressure tank T under the constant predetermined pressure. Still another function of the water storage pressure tank T is to permit the addition of the feedwater to the accumulated water while under the constant predetermined pressure in the water storage pressure tank T which pressure is higher than the pressure on the accumulated water in the flash chamber F. It is to be noted here that as a general rule the feedwater in similar type boilers is either added to the accumulated water while in the flash chamber F or is added to the accumulated water while under reduced pressure. If the feedwater is added to the accumulated water while in the flash chamber F then the feedwater must be preheated to the exact temperature of the accumulated water contained therein to prevent cooling of the body of accumulated water in the flash chamber F and also cooling of the flash chamber F with an appreciable loss of the steam available to meet the steam demand. If the pressure on the accumulated water is reduced before addition of the feedwater then ebullition of the accumulated water occurs as the pressure is reduced unless a heat exchange system is added to prevent loss of heat by the accumulated water due to said ebullition, furthermore in this case there is the additional loss of energy required to raise the pressure on the accumulated water back up to the original pressure on said water while in the flash chamber F.

The water storage pressure tank T provides a water reservoir bounded by a closed container, such as a tank or pipe, wherein the accumulated water withdrawn from the flash chamber F and the feedwater combine to form the water being maintained under the constant predetermined pressure, for subsequent forcing through the generator coils $G_1$ and $G_2$ under pressure from the water storage pressure tank T.

The primary function of the pump A is to raise the pressure on the feedwater sufficiently high to force said water into the water storage pressure tank T. The operation of the pump A is controlled by a pressure controller $a$ responsive to pressure in the water storage pressure tank T. Pressure controller $a$ can be any pressure operated control device such as a Brown Instrument Co. pressure controller model 7085-810. The pressure controller $a$ controls the operation of the pump A for the forcing of sufficient quantities of the feedwater into the water storage pressure tank T to maintain the water contained therein under the constant predetermined pressure while said water storage pressure tank T receives the accumulated water as and when it is discharged from the pump B and at the same time discharges the water contained therein under pressure through the generator coils $G_1$ and $G_2$. By forcing sufficient quantities of the feedwater into the water storage pressure tank T to maintain the water contained therein under the constant predetermined pressure, sufficient feedwater is thereby added to the water contained in the water storage pressure tank T to also maintain a substantially constant quantity of the water contained therein always available for forcing through the generator coils $G_1$ and $G_2$ and to compensate for the water in the form of steam being withdrawn through the steam outlet I to meet the steam demand. The pump A may be of any desired type and driven by any convenient means such as an electric motor.

While I prefer to add all of the feedwater to the accumulated water while in the water storage pressure tank (T) as shown, the invention is not limited thereto. For some operating conditions it is possible to add a portion of the feedwater to the accumulated water while in the flash chamber without departing from the spirit of the invention, in which case pump A adds the remaining portion of the feedwater to the accumulated water in sufficient quantities to maintain the water in the water storage pressure tank T under the constant predetermined pressure.

C is an air chamber connected to and communicating with the water storage pressure tank T. One function of the air chamber C is to provide an air cushion to yield to the forcing of the accumulated water into the water storage pressure tank T. Another function of the air chamber C is to allow sufficient feedwater to be forced into the water storage pressure tank T to maintain the water contained therein under the constant predetermined pressure while the last mentioned water is being discharged through the generator coils $G_1$ and $G_2$. Still another function of the air chamber C is to tend to maintain the pressure on the water contained in the water storage pressure tank T uniform during varying rates of flow of the feedwater and the accumulated water into the water storage pressure tank T. At times it is possible that a certain small amount of entrained air will be forced into the water storage pressure tank T along with the feed water or the accumulated water.

There are three principles of operation on which this steam boiler can operate to generate steam. The first two principles of operation are distinctly different from each other and the third principle of operation is a combination of the first two principles.

The first principle of operation employs a control valve, in place of the control valve H shown on the drawing, of a type which allows a constant predetermined rate of discharge of the heated stream of water, flowing from the generator coils $G_1$ and $G_2$, into the flash chamber F. A control valve of the type mentioned can simply consist of an orifice or can consist of a valve which can be adjusted and set to allow said heated stream of water to discharge into the flash chamber F at any one of a number of different rates of constant discharge. Once the constant rate of discharge of the heated stream of water flowing from the generator coils $G_1$ and $G_2$ into the flash chamber F is determined and fixed, the steam available to meet the steam demand is controlled by the heat input to the generator coils $G_1$ and $G_2$. The greater the heat input to the generator coils $G_1$ and $G_2$ the greater will be the ratio of steam separated to excess unvaporized water when the heated stream of water is discharged into the flash chamber F and vice versa.

A pressure actuated device $h$, responsive to pressure in the flash chamber F and connected thereto, is operatively connected (not shown on the drawing) with the valve M which controls the heat input to the generator coils $G_1$ and $G_2$. The pressure actuated device $h$ can be of the type as manufactured by the Brown Instrument Co. and named a "throttlor controller." The pressure actuated device $h$ is set to maintain the desired pressure in the flash chamber F. When the steam demand is increased and pressure in the flash chamber F tends to fall below the desired pressure, the device $h$ causes valve M to increase the heat input to the generator coils $G_1$ and $G_2$ and thereby increase the ratio of steam separated to excess unvaporized water to cause sufficient steam to be separated in the flash chamber F to meet the increased steam demand and maintain the desired pressure therein. When the steam demand decreases and the pressure in the flash chamber F tends to increase above the desired pressure the device $h$ causes valve M to decrease the heat input to the generator coils $G_1$ and $G_2$ and thereby decrease the ratio of steam separated to excess unvaporized water to cause a reduction of the steam separated in the flash chamber F and maintain the desired pressure therein.

The first principle of operation therefore is to discharge the heated stream of water flowing from the generator coils $G_1$ and $G_2$ into the flash chamber F at a constant predetermined rate and to vary the heat input to the generator coils $G_1$ and $G_2$ according to variations of the desired pressure in the flash chamber F, caused by variations in the steam demand, to cause the ratio of steam to excess unvaporized water separated in the flash chamber F to vary in such a manner as to make available sufficient steam to meet the varying steam demand and maintain the desired pressure in the flash chamber F.

The second principle of operation employs a control valve H of a throttling type which varies the rate of discharge of the heated stream of water, flowing from the generator coils $G_1$ and $G_2$, into the flash chamber F. Any throttling type control valve can be used without departing from the spirit of the invention; a suitable type being a Brown Air-O-Motor throttling valve as manufactured by the Brown Instrument Co.

A connection either mechanically by linkage (such as shown on the drawing) or otherwise is made between the throttling type control valve H and the valve M to cause the heat input to the generator coils $G_1$ and $G_2$ to vary with the rate of discharge of the heated stream of water, flowing from the generator coils $G_1$ and $G_2$, into the flash chamber F. This connection is so adjusted as to cause the ratio of steam to excess unvaporized water separated in the flash chamber F to remain at a predetermined fixed value irrespective of the rate of discharge of the heated stream of water flowing from the generator coils $G_1$ and $G_2$ into the flash chamber F. Consequently, the greater the rate of discharge of said heated stream of water into the flash chamber F the greater the heat input to the generator coils $G_1$ and $G_2$ and vice versa.

The pressure actuated device $h$ is now operatively connected with the throttling type control valve H and thereby interconnected with the connection between the throttling type control valve H and the valve M. It is to be clearly understood that the pressure actuated device $h$ controls the operation of said connection regardless of how the device $h$ may be connected or interconnected with said connection. The pressure actuated device $h$ is set to maintain the desired pressure in the flash chamber F. When the steam demand is increased and pressure in the flash chamber F tends to fall below the desired pressure the device $h$ causes the throttling type control valve H to increase the rate of discharge of the heated stream of water flowing from the generator coils $G_1$ and $G_2$ into the flash chamber F and at the same time causes valve M, which is connected with the throttling type control valve H, to increase the heat input to the generator coils $G_1$ and $G_2$ sufficiently to maintain the ratio of steam to excess unvaporized water separated in the flash chamber F at the predetermined fixed value. By allowing more of the heated water to be discharged into the flash chamber F more steam is separated and made available to meet an increase in the steam demand and maintain the desired pressure in the flash chamber F. When the steam demand is decreased and the pressure in the flash chamber F tends to increase above the desired pressure, the device $h$ causes the throttling type control valve H to decrease the rate of discharge of said heated stream of water flowing into the flash chamber F, and at the same time causes the valve M to decrease the heat input to the generator coils $G_1$ and $G_2$, sufficiently to cause a reduction of the steam separated in the flash chamber F and maintain the desired pressure therein.

The second principle of operation therefore is to maintain a predetermined fixed ratio of steam to excess unvaporized water separated in the flash chamber F while varying the rate of discharge of the heated stream of water flowing from the generator coils $G_1$ and $G_2$ into the flash chamber F in order to meet a varying steam demand and maintain the desired pressure in the flash chamber F.

The third principle of operation employs the throttling type control valve H and the connection between the throttling type control valve H and the valve M as with the second principle of operation except that instead of the connection between the throttling type control valve H and the valve M being adjusted to obtain a predetermined fixed ratio of steam to excess unvaporized water separated in the flash chamber F as before, the connection is now adjusted to vary the ratio of steam to excess unvaporized water separated in the flash chamber F.

The combination of rates of discharge of the heated stream of water into the flash chamber F and the ratios of steam to excess unvaporized water capable to being separated in the flash chamber F and the variations thereof are infinite in number. Suffice it to say that the best combination depends on the particular service for which the steam boiler is intended.

The third principle of operation therefore is to vary the rate of discharge of the heated stream of water flowing from the generator coils $G_1$ and $G_2$ into the flash chamber F and also vary the ratio of steam to excess unvaporized water separated in the flash chamber F to separate sufficient steam therein to meet a varying steam demand and maintain the desired pressure in the flash chamber F.

No matter on which principle the steam boiler is operating the stream of water being heated in the generator coils $G_1$ and $G_2$ is being forced therethrough under the constant predetermined pressure from the water storage pressure tank T. Therefore, the variations of pressure under which the water is being heated in the generator coils $G_1$ and $G_2$ are very small which tends to prevent uncontrolled ebullition of the water in the generator coils $G_1$ and $G_2$ due to the reduction of the pressure thereon.

Once the desired pressure to be maintained in the flash chamber F is known, this desired pressure is fixed and does not change. If the steam boiler is to supply steam at 200 lbs. per sq. in. pressure then this 200 lbs. per sq. in. pressure is the desired pressure to be maintained in the flash chamber F at all times. However, once the desired pressure to be maintained in the flash chamber F is known, the pressure under which the water is being maintained in the water storage pressure tank T must be determined. As can be easily seen there are any number of pressures under which the water contained in the water storage pressure tank T can be maintained. The higher the predetermined pressure under which the water contained in the water storage pressure tank T is being maintained the greater the reduction of pressure on the heated stream of water when said water is discharged into the flash chamber F from the generator coils $G_1$ and $G_2$. The higher the predetermined pressure under which the water contained in the water storage pressure tank T is being maintained the higher the heat content of the water being heated in the generator coils $G_1$ and $G_2$ can be raised without ebullition therein. In general the higher the predetermined pressure under which the water contained in the water storage pressure tank T is being maintained the dryer the steam being separated in the flash chamber F. For certain operating conditions the steam being separated in the flash chamber F can contain various degrees of superheat. It is to be noted that the pressure under which the stream of water is heated in the generator coils $G_1$ and $G_2$ is, except as influenced by friction, substantially the same as the predetermined pressure under which the water contained in the water storage pressure tank T is being maintained. Therefore, the quality of the steam being separated in the flash chamber F is controlled by the predetermined pressure under which the water contained in the water storage pressure tank T is being maintained which is substantially the same pressure under which the stream of water is being heated in the generator coils $G_1$ and $G_2$.

There are several safety devices which remove operational hazards and contribute to the practical operation of the steam boiler. These devices are explained in the following part of the specification.

A device $e$ actuated by and responsive to pressure in the flash chamber F and connected thereto is operatively connected with the throttling type control valve H. The device $e$ is set to operate when the pressure in the flash chamber F reaches a predetermined low pressure, lower than the desired pressure being maintained in the flash chamber F. When the pressure in the flash chamber F drops to the predetermined low pressure for which the device $e$ is set, the latter causes the throttling type control valve H to shut off automatically the heated stream of water flowing from the generator coils $G_1$ and $G_2$ into the flash chamber F and at the same time causes control valve M to shut off the fuel oil supply to burner L and thereby stop the heat input to the generator coils $G_1$ and $G_2$. Device $e$ takes precedence over the pressure operated device $h$ and once set in operation device $e$ must be reset before the steam boiler can again be placed in operation. The purpose of the device $e$ is to stop the heat input to the generator coils $G_1$ and $G_2$ and to cut off the flow of water being discharged into the flash chamber F through the throttling type control valve H in the event of an accidental break in the steam lines to prevent injury to the generator coils G₁ and G₂. Device e can be any low limit pressure cutout with manual reset, one suitable type being such as manufactured by the Brown Instrument Co.

In the pipeline 2 there is a checkvalve R₂. The purpose of the checkvalve R₂ is to prevent reverse flow of the stream of water in this pipeline in the event the pressure in the flash chamber F should accidentally increase above the pressure under which the stream of water is being heated in the generator coils G₁ and G₂ in which case the water would be forced out of the generator coils G₁ and G₂ and back into the water storage pressure tank T and cause burning out of the generator coils G₁ and G₂.

In the pipeline 3 there is a checkvalve R₃. The purpose of the checkvalve R₃ is to prevent the water contained in the water storage pressure tank T from flowing back through the pump B when the latter is not operating, and flooding the flash chamber F with water.

R₁ is a checkvalve to prevent the water contained in the water storage pressure tank T from flowing back through the pump A when the latter is not operating.

S₁ is a safety valve connected to the water storage pressure tank T. S₂ is a safety valve connected to the pipeline 2. S₃ is a safety valve connected to the flash chamber F. Each one of these safety valves is set to release excessive pressure and prevent bursting of the vessel or pipe to which it is connected if the pressure therein accidentally increases excessively.

On starting the steam generating boiler the following procedure may be used. The control valve H is closed. Then pump A is started and keeps running until the required pressure is reached in tank T at which time the pressure control device a stops operation of pump A. Then control valve H is opened slightly and cold water from generator coils and tank T falls into bottom of flash chamber F where pump B automatically removes it to water storage pressure tank T (as shown in drawing). After this cycle is begun the oil burner L is put in operation and begins to heat the water in generator coils G₁ and G₂. The heated water reaches control valve H, separates into steam and excess unvaporized water in flash chamber F and as soon as the desired steam pressure in flash chamber F is reached the valves H and M and pumps A and B work automatically to maintain the pressure in flash chamber F as constant as possible.

On shutting down the steam generating boiler the following procedure may be used. The fuel supply control valve M is closed so that no more fuel is burned in oil burner L. The water in generator coils G₁ and G₂ is no longer heated and as soon as cold water reaches control valve H no more steam is separated in flash chamber F. The pressure is flash chamber F falls and pressure control device e automatically closes valve H to the predetermined minimum rate of discharge and stops the heat input to the generator coils G₁ and G₂ after which power to pumps A and B may be shut off.

My invention is characterized in that: (a) the forced circulation of water over the heating surface of the boiler (through generator coils) can be increased according to the percentage of water which is unvaporized in flash chamber; (b) the quality of the steam may be changed without the use of additional devices; (c) the flash chamber, or chamber from which the steam is drawn, can be placed at any practical distance or level, either above or below, away from the heating surface (generator coils); (d) the boiler is economical to build, can be made compact, and due to the method used to control the forced water circulation and fuel burned or supplied, is very flexible and highly efficient.

In the specification above and the claims which follow below, it is to be noted that my invention is not dependent for its operation on the boiler liquid used. My invention will operate using any suitable liquid in the boiler such as can be used in any conventional type boiler to generate steam or to generate vapor of the liquid used.

I claim:

1. A steam generating boiler apparatus or unit comprising a generator heating water flowing under a substantially constant predetermined pressure, means for controlling the heat input to said generator to produce steam, a flash chamber and a first conduit from said generator to said flash chamber continuously discharging said steam and water to the latter, the flash chamber being under a substantially constant predetermined pressure which is lower than that in said generator and separating said steam from water still contained therein, a throttling type control valve in said conduit to regulate the rate of discharge of said steam into said flash chamber, means connecting said heat input controlling means and said throttling type control valve, means responsive to pressure in the flash chamber to automatically control said heat input means into the generator and regulate said throttling type control valve, a steam conduit extending from said flash chamber, a water tank having an air chamber communicating therewith and being under substantially the same constant pressure as said generator, a second conduit connecting said water tank with said generator and a third conduit for removing said water from said flash chamber to said water tank, a first pump means in said third conduit, means responsive to the level of said water in said flash chamber to automatically control said first pump means in order to maintain a predetermined level of the water in said flash chamber, a feeding conduit including a second pump means for feeding water into said water tank, and means responsive to the pressure in said water tank to automatically control said second pump means, thereby maintaining substantially constant pressure in said water tank.

2. A steam generating boiler apparatus or unit comprising a generator heating water flowing under a substantially constant predetermined pressure, means for controlling the heat input to said generator to produce steam, a flash chamber separating said steam produced in said generator from water still contained therein at a predetermined substantially constant pressure which is lower than that in said generator, a first conduit from said generator to said flash chamber continuously discharging said steam and water into the latter, a control valve in said conduit controlling the rate of discharge of said steam and water into said flash chamber, means responsive to the pressure in the flash chamber to automatically control the heat input to the generator by operative connection between said pressure responsive means in the flash chamber and said means for controlling the heat input to said generator and to maintain the predetermined substantially constant pressure in said flash chamber while steam is being withdrawn there-from, a steam conduit extending from said flash chamber, a water tank having an air chamber communicating therewith being under substantially the same constant pressure as said generator, a second conduit connecting said water tank with said generator, and a third conduit for removing water from the flash chamber to said water tank, a first pump means in said third conduit feeding water under predetermined pressure from said flash chamber to said water tank, means responsive to the level of said water in said flash chamber to control said first pump means in order to maintain a predetermined level in said flash chamber, a feeding conduit including a second pump means for feeding feed water into said water tank, and means responsive to pressure in the water tank to automatically control said second pump means so as to maintain substantially constant predetermined pressure in said water tank.

3. The apparatus, as set forth in claim 2, in which said control valve is adjustable and includes means for feeding the steam and water into said flash chamber at any one of a plurality of different constant rates of discharge.

4. The apparatus as set forth in claim 2, in which said control valve has an orifice permitting of discharging said steam and water into said flash chamber at a substantially constant predetermined rate of discharge.

JOHN MARINI.

REFERENCES CITED

The following references are of record in the file of this patent:

UNITED STATES PATENTS

| Number | Name | Date |
|---|---|---|
| 774,312 | Dodge | Nov. 8, 1904 |
| 2,049,652 | Jolley | Aug. 4, 1936 |
| 2,200,471 | Dickey | May 14, 1940 |
| 2,227,349 | Kerrick | Dec. 31, 1940 |
| 2,276,624 | Oeltjen | Mar. 17, 1942 |

FOREIGN PATENTS

| Number | Country | Date |
|---|---|---|
| 231,142 | Great Britain | May 13, 1926 |